United States Patent [19]
Lux et al.

[11] Patent Number: 5,243,622
[45] Date of Patent: Sep. 7, 1993

[54] DIRECT-SEQUENCE SPREAD-SPECTRUM COMMUNICATION SYSTEM WITH ASYNCHRONOUS DESPREADING

[75] Inventors: Paul A. Lux; Jeffrey M. Fischer, both of Poway, Calif.

[73] Assignee: General Dynamics Corporation, Electronics Division, San Diego, Calif.

[21] Appl. No.: 739,524

[22] Filed: Aug. 2, 1991

[51] Int. Cl.$^5$ .............................................. H04K 1/00
[52] U.S. Cl. ...................................................... 375/1
[58] Field of Search ........................ 375/1; 380/33, 34

[56]  References Cited
U.S. PATENT DOCUMENTS

| | | | |
|---|---|---|---|
| 4,092,601 | 5/1978 | Lee et al. | 375/1 |
| 4,550,414 | 10/1985 | Guinon et al. | 375/1 |
| 5,016,255 | 5/1991 | Dixon et al. | 375/1 |
| 5,031,191 | 7/1991 | Hiramatsu et al. | 375/1 |

OTHER PUBLICATIONS

IEEE Communications, vol. 22 No. 6 (Jun. 1984) pp. 6–21 Rappaport et al "Spread Spectrum Signal Aequisition Methods & Technology".

*Primary Examiner*—Salvatore Cangialosi
*Attorney, Agent, or Firm*—Brown, Martin, Haller & McClain

[57]  ABSTRACT

A direct-sequence spread-spectrum communication system having a receiver that despreads a received signal that has been modulated with a pseudonoise code generated by a linear feedback shift register. The receiver despreads the received signal by multiplying it with a limited number of delayed replicas of the received signal. Despreading is thus performed without need for a locally generated pseudonoise code or a synchronizing clock.

7 Claims, 1 Drawing Sheet

DIRECT-SEQUENCE SPREAD-SPECTRUM COMMUNICATION SYSTEM WITH ASYNCHRONOUS DESPREADING

BACKGROUND OF THE INVENTION

1. Field of the Invention

Our invention relates to spread-spectrum communication systems in general and, more specifically, to a direct-sequence spread-spectrum communication system requiring no despreading synchronization.

2. Description of the Related Art

Spread-spectrum communication systems are valued or their resistance to unwanted signal detection, jamming, and interference from multipath propagation and noise. Because of these advantages, practitioners in the art have devoted much attention to developing systems for spread-spectrum communication. The basic principle of spreading a communication signal over a wide bandwidth is well-known in the art. An overview of spread-spectrum principles is provided in J. G. Proakis, "Digital Communications," McGraw-Hill, New York, 1983. Various schemes for bandwidth spreading are known, including direct-sequence, frequency-hopping, time-hopping, and chirping. In most systems, an underlying pseudorandom code sequence is used to control the modulation. The code is often called a "pseudonoise" (PN) code because the received signal appears as white noise to a receiver that is not designed to detect a spread-spectrum signal.

In a direct-sequence spread-spectrum (DSSS) system, the carrier frequency phase is modulated by a PN code sequence having a bit rate that is much higher than the bandwidth of the information signal to be transmitted. The result of DSSS modulation is a sequence of phase transitions or "chips" at a constant carrier frequency. The rate at which these transitions occur is commonly called the "chip rate" and the duration of a single chip is commonly called the "chip interval." Most conventional receivers demodulate a DSSS signal using a cross-correlation method that multiplies the incoming signal with a local copy of the PN code sequence that is precisely in phase or synchronous with the incoming signal. The bandwidth of the resulting multiplied signal is then compressed or "despread" to its original value.

The PN code sequence generator is often physically implemented using a digital shift-register. The PN code sequence can be stored in the bits of the shift register, the final bit of which is used as the output. If the final bit is also fed back to the initial bit, the shift register continuously recirculates the PN code sequence. A long code sequence provides resistance to interception and jamming. The PN code sequence length can be increased by including feedback in the shift register. Instead of feeding back the final bit, several bits can be summed and fed back. For example, a 3-bit shift register having two feedback taps can generate a PN code sequence of length seven. This configuration is sometimes called a "linear-feedback shift register." The PN code sequence length can be increased by nonlinear methods, but these methods cause increased complexity in the receiver.

The unsolved problems inherent in spread-spectrum communication systems may be loosely grouped into two areas: "acquisition" or achieving the initial coarse phase alignment of the local PN code with the incoming signal and "tracking" or maintaining the two signals in synchronization long enough to recover the expected information signal. Rappaport et al. provide an overview of spread-spectrum communications with a focus on the acquisition problem in "Spread Spectrum Signal Acquisition: Methods and Technology," *IEEE Communications Magazine*, vol. 22, no. 6, June, 1984.

Information often is transmitted in short bursts for additional security, requiring a receiver to repeatedly and quickly acquire the signal. A large parallel network of correlators or matched filters can be used to minimize the acquisition time. When correlators are used, each successive parallel correlator uses a copy of the PN code sequence that is shifted in phase by one chip interval with respect to the previous correlator. The correlator having the largest output amplitude indicates the PN code sequence phase most closely synchronous to that of the incoming signal. This synchronous PN code sequence is then assumed to maintain synchronization with the expected incoming signal.

One disadvantage of such a "passive correlation" system is its susceptibility to jamming and interference. These active countermeasures may cause several correlator outputs to simultaneously rise to equal maxima. Another disadvantage is the complex hardware required to implement such a system, which increases dramatically with PN code sequence length. Because a PN code sequence length that is much longer than the duration of a transmitted information bit is desired to maximize spreading, the resulting hardware complexity forces the practitioner to consider other demodulation methods.

U.S. Pat. No. 3,980,945 issued to Bickford describes an autocorrelation method using delay lines. Bickford discloses the use of a shift register or read-only memory for producing a PN code sequence. However, Bickford does not consider the use of a shift register having a multiplicity of feedback taps for generating long PN code sequences.

The "active correlation" method involves successively stepping the phase of a single local copy of the PN code sequence and multiplying it with the incoming signal until despreading is detected. To detect despreading, the resulting multiplied signal is bandpass-filtered and envelope-detected. The envelope is then compared to a predetermined threshold level. If the threshold is not exceeded, the phase of the local PN code is changed and the threshold recompared. A clock signal synchronized with the chip rate is required to change the phase of the local PN code sequence. Once the threshold is exceeded, the two signals may be locked in phase by any suitable one of various tracking methods and the transmitted information signal recovered.

The advantage of active correlation is that it can be implemented without a large amount of hardware and is somewhat easier to adapt to different types of signals than is passive correlation. However, the hardware is still often quite complex. In addition, if the duration of the transmission is very short, the receiver may not have time to acquire the signal, causing the information to be lost. The active correlation method is often used in combination with other methods to achieve the desired balance between acquisition time and hardware complexity.

There is a strongly felt need in the art for a spread-spectrum communication system that is highly resistant to interception and jamming and minimizes acquisition time without undue hardware complexity. This problem is clearly felt in the art and is solved by our invention in the manner described below.

SUMMARY OF THE INVENTION

Our invention comprises a DSSS communication system. We use a transmitter configuration that is well-known to practitioners in the art. Our PN code sequence generator comprises a linear feedback shift register for generating a PN code sequence of a length greater than the length of the register. The bits appearing at the taps are summed and the result used as the input bit of the shift register. The output bit of the shift register is multiplied with a radio frequency (RF) carrier that has been modulated with the information to be transmitted. This multiplication causes the phase-shifting that is characteristic of DSSS signals. The resulting DSSS signal is amplified and transmitted. Although it is conceptually easier to consider the DSSS signal to be the result of waveform multiplication, the multiplication function may also be implemented using other suitable techniques such as modulo-2 addition followed by phase-shift keying (PSK) modulation.

We use a corresponding receiver that employs an assumption that the chip rate, the center carrier frequency, and the number of feedback taps of the shift register are known. Because these parameters are presumed known, the receiver does not require synchronization of the incoming signal with a locally generated PN code sequence to despread the received DSSS signal. Not only is no PN code synchronization required, but the signal is despread without the use of a clock signal.

In our invention, the receiver multiplies the incoming RF signal with several delayed replicas of the incoming signal, rather than a local copy of the PN code sequence as in conventional DSSS receivers. The number of delayed replicas required is equal to the number of feedback taps in the transmitter shift register. Thus, if the transmitter shift register were constructed with a single feedback tap, the receiver must multiply the incoming signal with a single delayed replica. The first replica is delayed by two "delay units," where a delay unit is equal to an odd number of cycles of the center carrier frequency. A delay unit should also be substantially equal to the chip interval. Thus, two delay units represent a delay period of an even number of cycles of the center carrier frequency and is close to two chip intervals in our PN code sequence generator. Each successive delayed replica should be delayed by a single additional delay unit.

The incoming signal is despread as a result of multiplication with the delayed replicas. The information signal may then be extracted from the despread signal by suitable conventional detection methods.

The advantage of our system over those that use active correlation is that the DSSS signal may be acquired quickly, reducing the probability that a short message will be lost. Unlike active correlation systems, it is unnecessary for our receiver to generate a local PN code sequence and wait for correlation lock with the incoming signal. Furthermore, our invention requires substantially less hardware than prior art systems.

While systems that use passive correlation techniques allow rapid acquisition, they must store a large number of codes in parallel and compare each code to the incoming signal. Our invention provides rapid acquisition without the need to store and compare long codes. The receiver of our invention requires at most a single delay line and multiplier for each feedback tap of the transmitter PN code generator.

The foregoing, together with other features and advantages of our invention, will become more apparent when referring to the following specification, claims, and accompanying drawings.

BRIEF DESCRIPTION OF THE DRAWINGS

For a more complete understanding of our invention, we now refer to the following detailed description of the embodiments illustrated in the accompanying drawings, wherein.

DESCRIPTION OF THE PREFERRED EMBODIMENT

Figure 1:
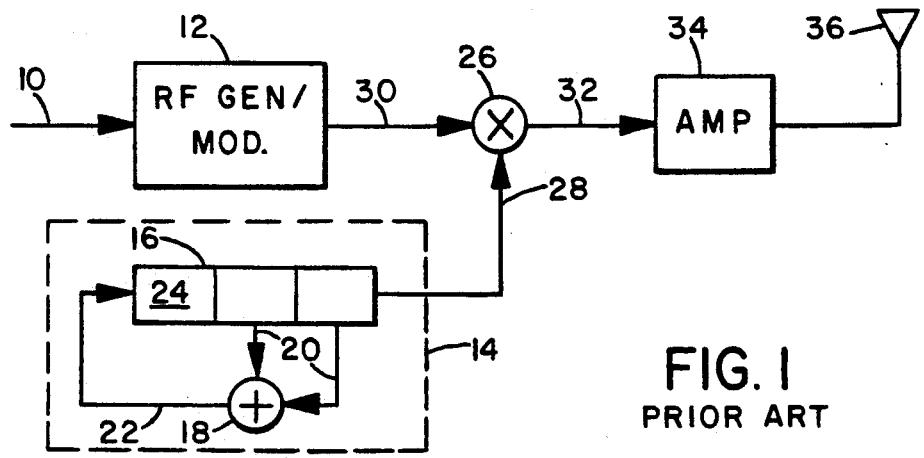
FIG. 1 is a block diagram of a prior art direct-sequence spread-spectrum transmitter.

FIG. 1 shows a generalized DSSS transmitter known to practitioners in the art. Information 10 is used by a generator/modulator 12 to modulate a radio frequency (RF) carrier wave (not shown). Various modulation schemes are suitable, such as amplitude modulation (AM), frequency modulation (FM) or phase modulation (PM). The PN code sequence generator 14 comprises a linear feedback shift register 16 and an adder 18. Some of the bit locations of shift register 16 have feedback taps 20, which present those bits as inputs to adder 18. The output of adder 18 is a sum bit 22, which is fed back to the input bit 24 of shift register 16. Shift register 16 is shown in FIG. 1 having three bits and two feedback taps 20, yielding a code sequence of length seven. Longer shift registers may be used to yield longer code sequences and thereby provide greater protection against unwanted interception or jamming of the transmitted signal.

A multiplier 26 multiplies the generated code sequence 28 with the modulated RF carrier 30. The resulting DSSS signal 32 is spread because the phase of modulated RF carrier 30 changes at a certain chip rate dictated by code sequence 28. DSSS signal 32 is then amplified by an amplifier 34 and radiated by an antenna 36.

Figure 2:
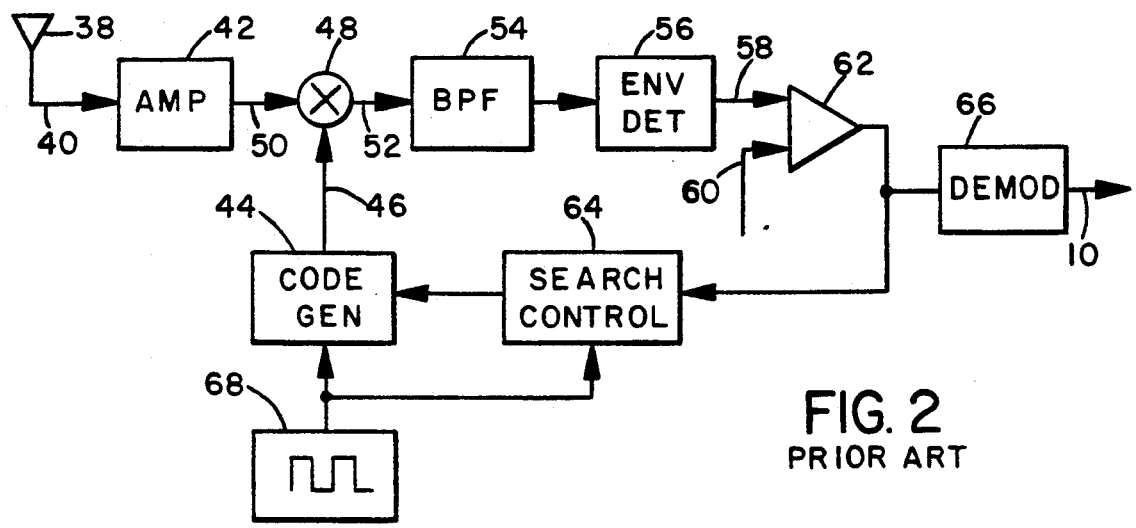
FIG. 2 is a block diagram of a prior art direct sequence spread spectrum receiver.

FIG. 2 shows a typical active correlation DSSS receiver known to practitioners in the art. An antenna 38 receives the radiated DSSS signal (not shown). The received signal 40 is then amplified by an amplifier 42. To acquire or "search" for an incoming DSSS signal 32, a local PN code sequence generator 44 generates a local copy 46 of PN code sequence 28. Multiplier 48 multiplies the amplified incoming DSSS signal 50 with the local PN code sequence 46. The product 52 is then filtered by a bandpass filter 54 and detected by an envelope detector 56.

The envelope signal 58 is then compared to a threshold level 60 by comparator 62 for some period of time spanning a selected number of chips. If signal 58 does not exceed threshold level 60, the search controller 64 causes local PN code sequence generator 44 to slip the phase of the local PN code sequence 46 by some amount of time, preferably by one-half a chip interval. This process is repeated with PN code sequence 46 in the new or slipped phase. If threshold level 60 is not exceeded, the phase is slipped again. When threshold level 60 is finally exceeded, indicating a despreading of received DSSS signal 40, search controller 64 locks the phase of local PN code sequence 46, which is now known to be synchronous with incoming DSSS signal 40. In this stable state, a demodulator 66 may recover the original information signal 10. A clock signal generator 68 is required to synchronize PN code signal generator 44 with incoming DSSS signal 40.

Figure 3:
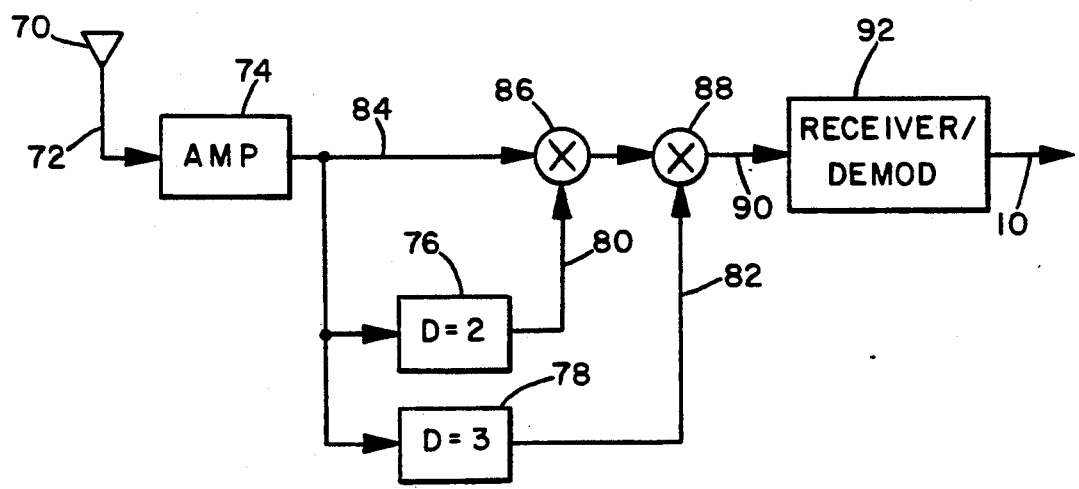
FIG. 3 shows the preferred embodiment of the direct-sequence spread-spectrum receiver of our invention.

FIG. 3 illustrates the preferred embodiment of the DSSS receiver of our invention, which is capable of receiving signals radiated from antenna 36 of FIG. 1. An antenna 70 receives the transmitted DSSS signal (not shown) as a received signal 72, which is then amplified by an amplifier 74. The delay lines 76 and 78 provide the delayed replicas 80 and 82, respectively, of the amplified DSSS signal 84. The number of delayed replicas is equal to the number of feedback taps 20 of the transmitter shift register 16 shown in FIG. 1. The receiver of FIG. 3 comprises two delay lines 76 and 78, which correspond in number to the two feedback taps 20 in the transmitter of FIG. 1.

Two multipliers 86 and 88 multiply delayed replicas 80 and 82 with amplified DSSS signal 84. The multiplication may be physically accomplished by any suitable method commonly used by practitioners in the art. The result is a self-correlation of received signal 72, which causes it to be despread. The despread signal 90 may then be received and demodulated by demodulator 92 to recover information signal 10. Delay lines 76 and 78 are calibrated in "delay units," where one delay unit is substantially equal to the chip interval of signal 72. The delay line values range from two delay units to a number equal to the number of feedback taps (in this example, 3) of shift register 16, in increments of one delay unit. In addition to being substantially equal to the chip interval, a delay unit should be equal to an odd number of cycles of the carrier frequency from RF generator/modulator 12 in FIG. 1.

Our receiver, shown in FIG. 3, provides a substantial reduction in both hardware complexity and amount over the active correlation receiver shown in FIG. 2. Furthermore, the hardware complexity of our invention does not increase in direct proportion to code sequence length as do other passive correlation systems.

Obviously, other embodiments and modifications of our invention will occur readily to those of ordinary skill in the art in view of these teachings. Therefore, our invention is limited only by the following claims, which include all such other embodiments and modifications when viewed in conjunction with the above specification and accompanying drawings.

We claim:

1. A communication system receiver for despreading a direct-sequence spread-spectrum signal having a predetermined chip interval and center carrier frequency, said spread-spectrum signal being modulated with an information signal and being spread by a linear feedback shift register having a plurality of taps, said receiver comprising:
    a plurality of delay means, the number of said delay means being equal to the number of said taps, each said delay means for delaying said spread-spectrum signal and to produce a delayed replica; and
    multiplication means for multiplying said spread-spectrum signal with each said delayed replica and to produce a despread signal.

2. The communication system receiver described in claim 1 wherein:
    each said delay means delays said spread-spectrum signal by a unique integral number of delay units.

3. The communication system receiver described in claim 2 wherein:
    each said delay unit is substantially equal to said chip interval.

4. The communication system receiver described in claim 3 wherein:
    each said delay unit is equal to an odd number of cycles of said center carrier frequency.

5. The communication system receiver described in claim 1 wherein said multiplication means comprises:
    a plurality of multipliers, each corresponding to only one of said delay means.

6. The communication system receiver described in claim 5 further comprising:
    antenna means for receiving said spread-spectrum signal and to produce a received spread-spectrum signal;
    amplifier means for amplifying said received spread-spectrum signal and to produce an amplified spread-spectrum signal; and
    demodulation means for recovering said information signal from said despread signal.

7. A method for despreading a direct sequence spread-spectrum signal having a predetermined chip interval and center carrier frequency, said spread-spectrum signal being modulated with an information signal and being spread by a linear feedback shift register having a plurality of taps, comprising:
    forming a plurality of delayed replicas of said spread-spectrum signal, the number being equal to the number of said taps, each delayed by a unique amount of time; and
    multiplying said spread-spectrum signal with each said delayed replica.

* * * * *